(No Model.)
2 Sheets—Sheet 1.
W. R. FOX.
DADO CUTTER.
No. 384,248.
Patented June 12, 1888.
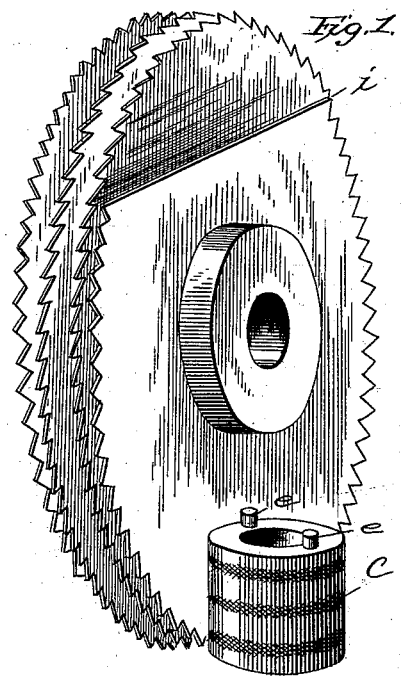
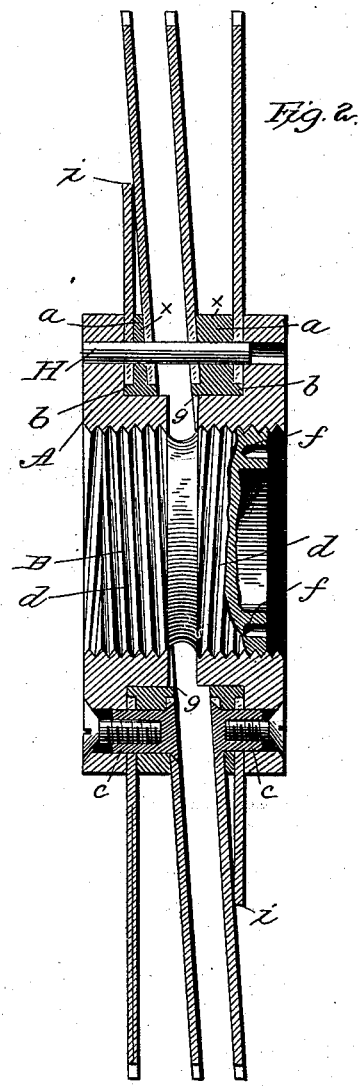
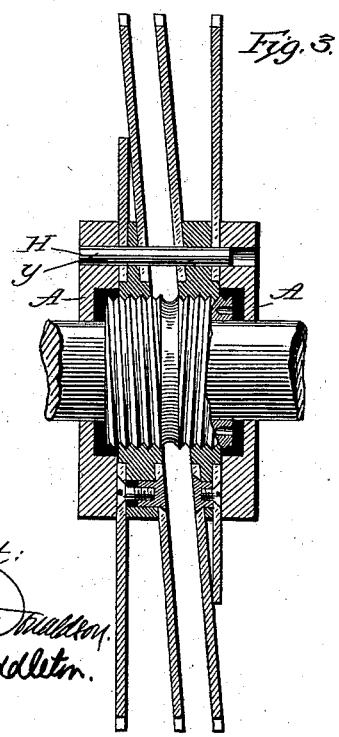
Attest:
Walter Truesdell.
F. L. Middleton.
Inventor:
William R. Fox,
by Ellis Spear.
Atty.

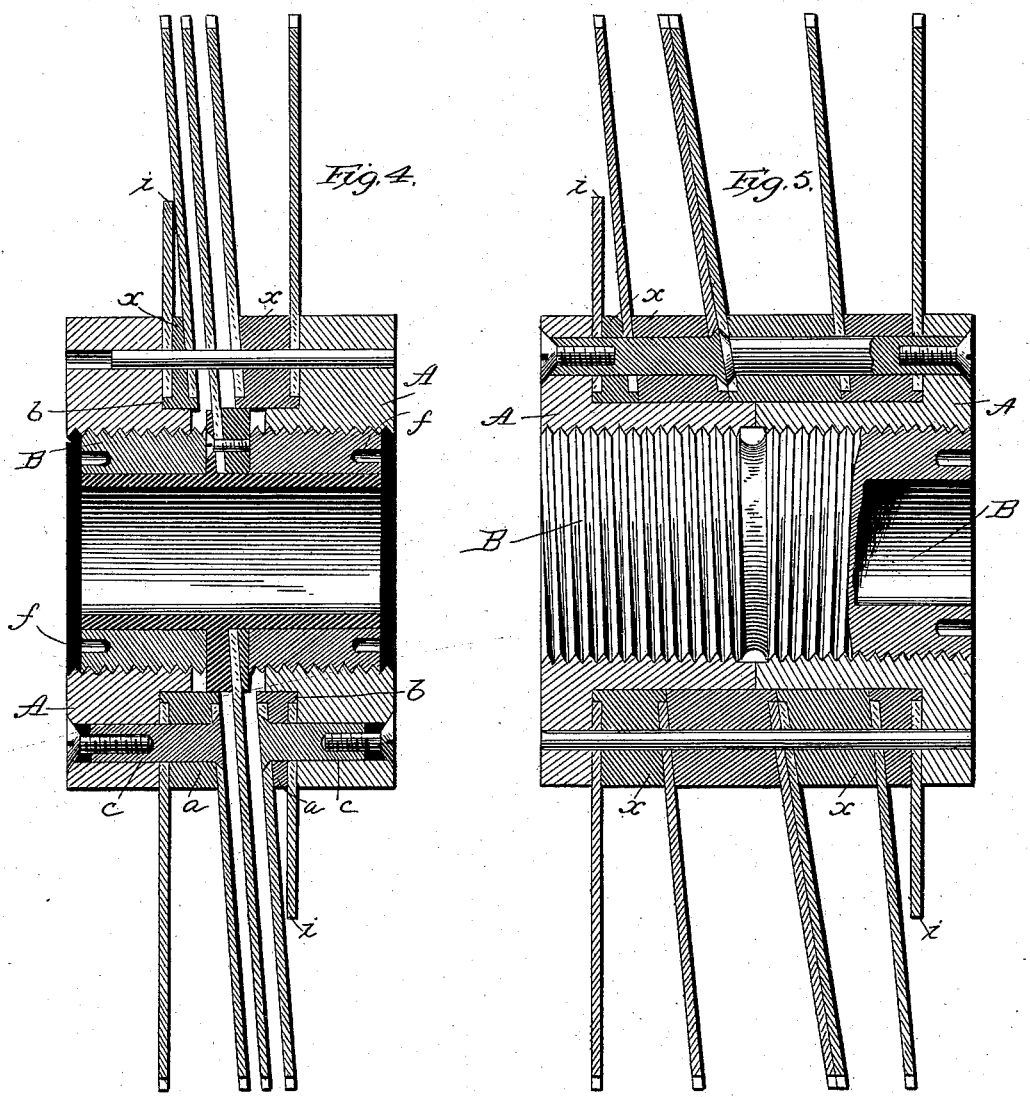

UNITED STATES PATENT OFFICE.

WILLIAM R. FOX, OF GRAND RAPIDS, MICHIGAN.

DADO-CUTTER.

SPECIFICATION forming part of Letters Patent No. 384,248, dated June 12, 1888.

Application filed March 10, 1888. Serial No. 266,911. (No model.)

*To all whom it may concern:*

Be it known that I, WILLIAM R. FOX, of Grand Rapids, in the county of Kent and State of Michigan, have invented a new and useful Improvement in Dado-Cutters; and I do hereby declare that the following is a full, clear, and exact description of the same.

Heretofore application has been made by J. R. Mentzer—namely, on the 27th day of May, 1886, Serial No. 203,486—for a grooving-saw having two outer or guiding saws adapted to cut a certain width of groove, with an intermediate saw arranged across the space between the two saws at an angle, and adapted to complete the groove by removing the material between the cuts made by the two outer saws. In this construction, however, no adjustment is permitted, and but one width of groove can be cut.

In my invention I have aimed to provide a construction adapted to be adjusted to cut grooves of different widths, and at the same time to retain all the simple and effective features of the Mentzer invention. Saws belonging to this class are usually called "dado-cutters," and may be applied not only to the cutting of grooves, but to all other purposes for which they may be found adapted.

The invention consists, broadly, of outer parallel saws adapted to cut the width of groove, and intermediate saws arranged at an angle to the outer saws and occupying the space between them, whereby the material between the outer lines of the groove will be removed, the said saws being adjustable in relation to each other, so as to cut a narrower or a wider groove.

Further, the invention includes outer marking-saws and intermediate saws for removing the material between the lines formed thereby, said saws being arranged in series, the outer saw of each series being vertical and the inner saw or saws inclined, the saws of each series being adjustable in relation to the saws of the other series, whereby different widths of grooves may be cut.

Further, the invention consists of saws arranged in pairs, one saw of each pair being vertical and the other inclined, the saws of each pair being adjustable.

Further, it consists of saws connected together in pairs by a suitable collar, one of said saws being straight and the other inclined, and providing a sleeve screw-threaded, with right and left hand threads at opposite ends for adjusting each pair simultaneously toward or from each other.

The invention also consists of details of construction, hereinafter fully described.

In the accompanying drawings, Figure 1 represents a perspective view of my improved cutter. Fig. 2 is a vertical central section of the saw shown in Fig. 1. Fig. 3 is a modification showing the saws mounted directly through their supporting-collars upon the threaded sleeves. Fig. 4 is a second modification showing a central saw interposed between the pairs of saws, and Fig. 5 is a third modification showing a double set of inclined saws.

In Figs. 1 and 2 I have shown the cutter as composed entirely of saws, four in number. I arrange these saws in pairs, with the outer saw of each pair in vertical plane and the inner saw inclined thereto. These saws are connected together in this relative position by means of a collar, $x$, having a central bearing-ring, $a$, straight on its outer face and inclined on its inner face, with a lower flange, $b$, of greater width than the ring $a$, so as to provide a projecting edge for the support of the inner peripheries of the saws, it being understood that annular openings are formed in the centers of said saws. The other pair of saws is arranged in the same manner, the inclined saws of each set being parallel to each other and the straight saws of one pair parallel to the corresponding saw of the other pair. The collars to which the saws of each pair are secured, as described, are in turn supported on rings A A. The outer diameter of these rings is about equal to the diameter of the rings $a$, and upon their inner faces they are provided with projecting flanges forming seats for the flanges $b$ of the collars to which the saws are secured. Each of the rings A A and the saws are held firmly together by means of internally-screw-threaded thimbles which pass through openings formed in the rings and saws of each set. These thimbles are shown at $c$ and have rivet-heads. From the opposite side a screw is inserted having external threads adapted to screw within the thimbles, and thus securely clamp the saws of each set to one of the rings.

The rings A A are mounted on a sleeve, B, having right and left hand threads, as shown at d d, the rings being correspondingly screw-threaded and adapted thereto. The sleeve B is adapted to be turned by means of a wrench, C, having projecting pins e, which fit corresponding recesses f in one face of the threaded sleeve. By turning this sleeve the saws of each pair are adjusted toward or from each other to lessen or widen the width of the cut to be made. As shown in Fig. 2, the width of the ring a is less than the width of the flange of the ring A at one point, and exceeds it at another point, g, and in the closing of the rings to their minimum extent the opposing faces of the flanges come together. One of the rings A is provided with a guiding-pin, H, which passes through an opening in the opposite ring and saws. While the form described is the one I prefer to use, I may, as in Fig. 3, have the outer rings, A A, loose and only held in place by the guide-pins H, passing through the saws of each pair, to prevent them from turning, and screw-threading the inner peripheries of the collars to which the saws are secured, so that they may be mounted directly upon the screw-threaded sleeve, the operation and adjustment being precisely the same.

It will be understood that it is not absolutely essential that all the saws arranged between the outer parallel saws be made movable, as I may permanently secure an intermediate saw or saws in the center between the movable inclined saws, as shown in Fig. 4. In this figure the parallel vertical saws and the pair of inclined movable saws are substantially the same as shown in the other figures, the vertical and inclined saws being arranged in pairs and supported on collars, which are in turn mounted upon a right and left hand screw-threaded sleeve, the movement of which increases or diminishes the distance between the inclined saws. In this figure, however, I have shown a central saw, which is made stationary by being secured between a projecting ring or flange cast with or secured to the center of the screw-threaded sleeve, an annular ring clamping the saw against the said flange, as shown. The adjustable collars which carry the moving saws are recessed on their internal periphery, so as to allow of the adjustability of said collars in close proximity to the central saw. In Fig. 5 I have shown a modification, in which, instead of the single inclined saw arranged in connection with the vertical outer saw, I have shown two of these saws in connection with each of the said outer saws, the three saws of each set being supported upon adjustable collars, substantially as described hereinbefore in connection with a single inclined saw being mounted upon the adjustable collars, which are moved to increase or diminish the distance of each set by the movement of the screw-threaded sleeve upon which the said collars are mounted, spacing-rings being interposed between the saws to separate them.

The outside saws, as shown at i, have a segment of their periphery cut away, so as to allow the inclined saws to overlap, which permits of continued use of the head, even after the inner saws have become worn.

I claim—

1. A dado-cutter consisting of two outer saws arranged parallel to each other, and intermediate saws arranged at an angle thereto, adjustable with the outer saws, to lessen or widen the cut, substantially as described.

2. A dado-cutter consisting of outer parallel saws and inner inclined saws occupying the intermediate space, the outer and inner saws being connected in pairs or series, and adjustable toward or from each other, to lessen or widen the cut, substantially as described.

3. A dado-cutter consisting of outer parallel saws and inner inclined saws connected in pairs or series, and mounted upon a right and left hand screw-threaded sleeve, whereby the saws are adjusted to different widths, substantially as described.

4. In a dado-cutter, parallel outer saws, inner inclined saws, flanged rings for connecting the saws together in pairs or series, and outer rings internally screw-threaded, one upon each side, connected one to each set of saws, and a right and left hand screw-threaded sleeve, upon which the rings are mounted and by which the series of saws are adjusted, substantially as described.

5. The combination, in a dado-cutter, of the outer rings, A A, having inner flanges, straight and inclined saws arranged in series and supported on said inner flanges, thimbles and screws for securing the rings and saws of each set together, and a right and left hand screw-threaded sleeve adapted to corresponding threads on the rings A A, substantially as described.

6. The combination, in a dado-cutter, of the straight and inclined saws arranged in pairs, a right and left hand screw-threaded sleeve for adjusting the saws, having depressions on its face, and a wrench for operating the sleeve, having projecting pins adapted to the depressions, substantially as described.

7. A dado-cutter consisting of two outer adjustable saws arranged parallel to each other, intermediate inclined saws adjustable with the outer saws, and a fixed inclined saw between the adjustable inclined saws, substantially as described.

8. A dado-cutter consisting of two outer adjustable saws arranged parallel to each other, and a double set of intermediate inclined saws, the saws of each set being adjustable with the respective outer saws, substantially as described.

In testimony whereof I have signed my name to this specification in the presence of two subscribing witnesses.

WILLIAM R. FOX.

Witnesses:
LEONIDAS G. WOOLLEY,
BESSIE POWERS.